United States Patent

Fu et al.

[11] Patent Number: 5,564,589
[45] Date of Patent: Oct. 15, 1996

[54] POT OR PAN

[76] Inventors: Hseuh-Chien Fu; Alvin Fu, both of 1098 Ravoli Dr., Pacific Palisades, Calif. 90272

[21] Appl. No.: 384,748

[22] Filed: Feb. 7, 1995

[51] Int. Cl.$^6$ .................................................. A47J 27/026
[52] U.S. Cl. ........................... 220/608; 220/912; 220/670; 220/673; 220/446
[58] Field of Search ..................... 99/403, 447; 220/400, 220/608, 609, 604, 670, 673, 672, 671, 674, 675, 446, 447, 912

[56] References Cited

U.S. PATENT DOCUMENTS

| | | | |
|---|---|---|---|
| 2,722,173 | 11/1955 | Cunningham | 220/912 |
| 3,799,048 | 3/1974 | Finley | 99/447 |
| 4,646,717 | 3/1987 | Baggioli | 99/447 |
| 5,415,082 | 5/1995 | Nagao | 220/912 |

FOREIGN PATENT DOCUMENTS

| | | | |
|---|---|---|---|
| 2331988 | 6/1977 | France | 99/447 |
| 2493125 | 5/1982 | France | 99/447 |
| 364878 | 11/1962 | Switzerland | 99/447 |

*Primary Examiner*—Stephen J. Castellano
*Attorney, Agent, or Firm*—Beehler & Pavitt

[57] ABSTRACT

A more efficient flat bottom pot or pan is obtained by (a) the introduction of an initial central downward depression in the bottom plate in the order of twice the plate thickness to avoid the undesirable upward bulging of the pot bottom as a result of aging, (b) providing heat transferring fins in a spiral pattern to the bottom and helical pattern to the side wall of the pot or pan for more effective heat transfer from the stove flame to the pot or pan, and to stabilize the pot with its central depression for placement on flat surfaces, and (c) providing a detachable shielding skirt around the pot to reduce the heat loss from radiation and convection.

4 Claims, 3 Drawing Sheets

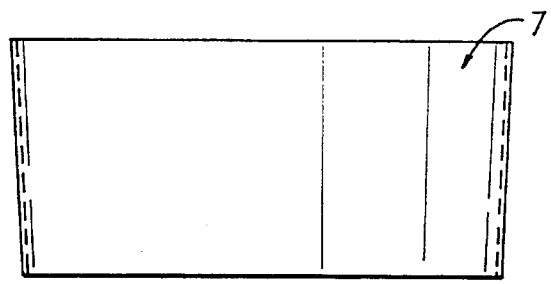
Fig. 5
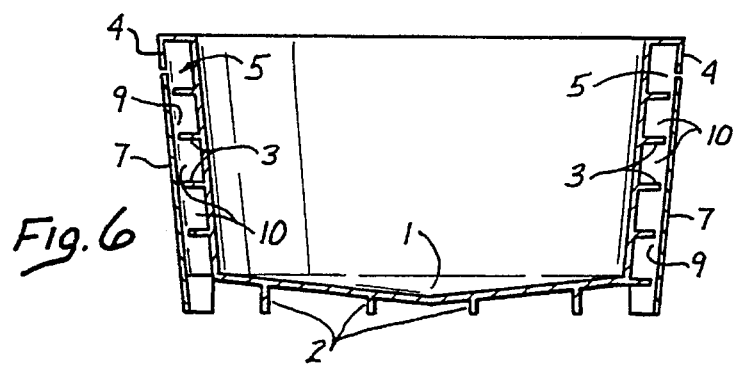
Fig. 6
Fig. 8
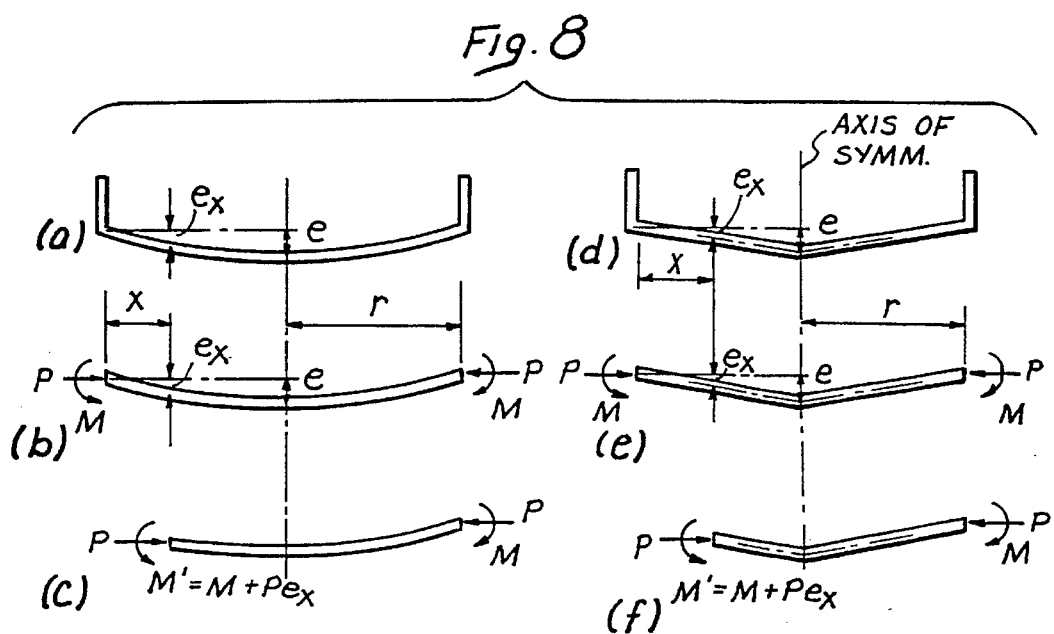

POT OR PAN

FIELD OF THE INVENTION

This invention relates to cooking utensils, particularly to flat-bottom pots and pans used for preparing food and heating liquids.

For simplicity, hereafter, when the word "pot" is used, it shall comprehend pots and/or pans.

BACKGROUND OF THE INVENTION

Helping in the kitchen at home through the years has resulted in the applicants' noticing two interesting phenomena. First, when a flat-bottom pot ages, its bottom often tends to bulge upward. Second, when the pot is heated from below by open flames, there is a tremendous amount or heat loss around the side of the pot.

The bulging phenomenon is somewhat contrary to common sense. As in the case of bi-metals used in thermostats and watch pendulums, one would expect the pot bottom to bulge downward due to uneven thermal expansion since the lower side of the pot bottom experiences higher temperature and hence expands more than the upper side. The reality, however, is just the opposite.

This central upward bulge is undesirable. For example, when frying an egg, one would like to place the egg near the center of the pot since the heat source from the stove gas flame or electric coil is normally close to the center of the pot. It is only natural to expect that the oil used for frying will stay near the center of the pot so that the oil can be heated more economically and the egg be fried more effectively. However, a central bulge in the pot will displace all the oil to the perimeter of the pot, leaving the central region hot and dry, smoking with smelly oil vapor, resulting in a scorched egg with broken yolk.

The reason why such bulges form is not difficult to understand. When the originally flat bottom of the pot is heated, it tends to expand. The cooler surrounding edge and vertical side of the pot, however, restrains it from free expansion, creating compressive stresses in the bottom plate. If the temperature gradient with respect to the plate thickness were uniform, the compressive stresses would be uniform, and no bulge would occur. However, during cooking, heat is extracted from the top surface of the plate, making the top surface temperature (say, of the order of the boiling point of water) substantially lower than the bottom surface temperature (which is closer to the stove flame temperature, several hundred degrees higher). Thus, the top surface tends to expand less than the bottom surface. Therefore, the top surface restraining compression $\sigma_1$ is less than the bottom surface restraining compression $\sigma_2$, forming a pressure gradient with respect to the plate thickness as shown in FIG. 7(a), which is the cross section of the free body of the flat part of the pot bottom. This non-uniform pressure field, linear or non-linear, can always be replaced by an equivalent force system of an axial force P and a bending moment M per unit length on the center plane of the plate along the circumferential boundary of the free body as shown in FIG. 7(b). It is this bending moment M, created by the larger compressive stress on the lower side of the plate relative to the upper that causes the plate to bulge upward, which, in turn, creates an eccentricity for the axial P to induce additional moment to aggravate the bulging. If, hypothetically, there exists such a material for making the pot that it does not creep under the high temperature of the stove flame, the bulge will disappear after the flame is removed and the pot is cooled off to the previous stress-free room temperature condition. The slight bulge during cooking would not be that intolerable. However, in actual life, the material does creep under stress at high temperature. Therefore, the metal normally used for making the pot tends to lose its ability to recover to its original flat condition, causing the so-called permanent set of the bulge. Although this permanent set is very small each time the pot is used, it is cumulative. After the pot is used hundreds of times, the bulge becomes prominent, rendering the pot less desirable, and often results in shortened pot life.

Since most material with good heat conducting properties for pot-making more or less creeps under the high flame temperature, it is almost impossible to completely avoid this bulge in the flat bottom plate a pot. Fortunately, a slight bulge in the opposite direction would be a favorable condition for cooking. Take frying an egg as an example again. A slight depression at the center of the pot results in collecting the oil in the middle where the heat source is; and, when the fresh egg is placed there, its gravity presses the hot oil radially outward, forming a layer of hot oil beneath the egg, ideal for cooking. It is interesting to note that by introducing a suitable small central initial downward depression in the pot, the problem of upward bulge can be avoided. This initial bulge can be of a spherical of conical or any other single curvature surface.

FIG. 8(a) and FIG. 8(d) show the cross sections of a practically flat bottom pot with an exaggerated initial downward central depression or eccentricity e in the form of a spherical and conical cap respectively. First, according to the theory of structures, it has transformed a flat plate problem into a problem of shells; the latter is much stronger in resisting transverse deflections. Secondly, the initial eccentricity can induce an opposite bending moment to counterbalance the moment causing the upward bulge.

Just as in the case of a flat bottom pot, when heated from below, because of the thermal expansion and the non-uniform temperature gradient across the thickness of the bottom, there is the axial force P and the bending moment M acting at the perimeter of the free body of the spherical or conical bottom of the pot as shown in FIG. 8(b) and FIG. 8(e). Qualitatively, by taking a two-dimensional (instead of the actual three-dimensional shell problem which is more complicated) beam theory approach, at a point x from the perimeter as shown in FIG. 8(c) and FIG. 8(f), the bending moment there consists of two parts, namely, the temperature gradient induced M mentioned above and a second moment $M'=Pe_x$ created by the axial force P and the initial eccentricity $e_x$ at x. Note that the two moments M and M', are opposite in sense; and, if the initial eccentricity is sufficiently large, M' can be larger than M everywhere except near the perimeter of the freebody. Therefore, there will be no upward bulge, and most probably, there will be some additional but very limited downward deflection.

The minimum value of the initial downward eccentricity e is difficult to determine owing to the fact that it involves many variables including, but not limited to, the properties of the material used for the pot, the non-uniformity of the temperature of the stove flame, the flame temperature level and its size relative to that of the pot, the uneven heat extraction form the upper surface of the pot, the fixities of the side of the pot, etc. Fortunately, a precise determination is unwarranted since a larger e is harmless. For ordinary pots, a rough order-of-magnitude analysis (see next section) indicates that an initial central eccentricity of two times the thickness of the bottom plate of the pot is sufficient.

So, the problem of preventing the upward bulge of the flat bottom of an aged pot is resolved. Attention is now turned to the improvement on the second phenomenon of heat loss around the side of it. For the convenience of discussion, when the word "flame" is used, it shall mean the actual flame and the heated air around it from which heat can be transferred to the pot.

The reduction of heat loss can be accomplished in two aspects, namely, (a) by more efficiently transferring the heat from the flame to the pot, (b) by reducing the heat loss through radiation and convection from the flame into the surrounding air.

According to the basic principles of physics, the heat transferred to the pot from the flame is proportional to the area of contact of the flame with the pot, and also proportional to the time duration of the contact. Therefore, for efficient heat transfer, the flame-pot contact area should be made large and the contact duration should be made long.

For larger flame-pot contact area, the best way is to attach, to the underside and the side-wall surface of the pot, "fins" like those used in heat exchangers. Normally, such fins are made thin and dense for more efficient heat transfer. However, for pots and pans, they should be made more healthy in order to withstand the abusive conditions of cooking and washing.

For longer flame-pot contact duration, the fins should be attached to the bottom and side of the pot in a spiral pattern so as to channel the flame spiraling outward from the central part of the bottom to the outside edge and then helically upward along the side of the pot. Such channeling of the flame through the spiral/helical paths, without doubt, will increase the flame-pot contact duration.

It will also be appreciated that the central depression hereinabove suggested makes the pot unstable when placed on flat surfaces or stove tops. This can be rectified by having the fin depths tapered in the opposite direction to compensate for the depression to avoid this awkwardness.

To reduce the heat loss through radiation and convection around the pot, the most direct method is to attach a shield around it. For easy cleaning, such shield should be detachable. For free expansion of the pot and the fins, a slight gap should preferably be provided between the fins and the shield. The shield should be made of heat insulating material with or without metal lining. Exhaust vents should be provided in the returns of the upper edge of the shield or that of the pot where the shield meets the pot brim.

Thus, the improvement of heat loss reduction is accomplished, and an improved pot is created.

The longer pot life and the energy saved by using the pot of the present invention each time is insignificant. However, since a pot or pan is something almost everybody in the world uses, directly or indirectly, every day of the year, the cumulative saving is definitely significant. In the present energy and ecology conscious world, it is hoped that the pot of the present invention can make some contribution.

ORDER-OF-MAGNITUDE CALCULATION OF ECCENTRICITY

For a rough estimate of the required downward central eccentricity e needed to avoid the upward bulge of the circular flat bottom plate of a pot, the following assumptions are made for simplicity. (a) Since e is small, the bottom plate with the eccentricity e can still be treated like a plate in lieu of a shell. (b) No creep is considered. (c) The surface temperature of the bottom plate is the same throughout each of the upper or the lower surface, and the temperature gradient across the plate thickness is linear. Therefore, it becomes a circular plate under pure bending with uniform in-plane forces. (d) A small strip of t width b of the bottom plate through the center (a diameter strip) can be taken out and be treated with the small deflection beam theory (i.e. the Poisson effect is neglected or Poisson's ratio 1)=0). (e) The perimeter of the bottom plate or the Tends of the beam are first assumed to be unyielding, both axially and flexurally. Then they will be relaxed to their final situation; and these axial and flexural relaxations are assumed to be of similar proportions.

Notice that, while the other assumptions are reasonably close to reality, the last one may be off. In actuality, the plate boundary is neither completely rigid axially nor completely rigid flexurally. The degree of bending fixity at the plate perimeter depends on the flexural rigidity of the pot wall, while the degree of axial rigidity depends on the strain from hoop tension and the thermal expansion of the perimeter part of the bottom plate relative to the interior. It is very difficult to ascertain the exact amount of these relaxations. Since an upper limit, rather than the precise value, of e is desired here, to avoid complicated, involved, and probably not much mope accurate calculations, it will be assumed that the degrees of relaxation from the complete fixities with respect to the axial force and bending will be of the same proportion. The inaccuracy induced by this assumption will be compensated in later calculation by making e large so that the e-induced moment M' will become much larger than the bulging moment M.

Let t=plate thickness

E=Young's modulus $\sigma$=Axial stress $\sigma_t$=Stress at plate top surface $\sigma_b$=Stress at plate bottom surface $\beta$=Axial strain $\beta_t$=Strain at plate top surface $\beta_b$=Strain at plate bottom surface $\alpha$=Coefficient of thermal expansion r=Radius of circular bottom plate of pot $T_t$=Surface temperature of plate top above the stress-free room temperature $T_b$=Surface temperature of plate bottom above the stress-free room temperature $e_x$=Initial eccentricity at x from pot bottom the perimeter (See FIG. 8(b) and FIG. 8(e)); $e_x$=e when x=r.

FIG. 9(a) is the right half of FIG. 8(b) or FIG. 8(e); but, instead of a circular plate, it is considered to be a beam of depth t and width b with fixed ends. During cooking, assume the heat transfer has reached a steady state condition with the plate bottom temperature to be $T_b$ and that of the plate top $T_t$. The stress at the beam end, shown in FIG. 9(a), can be considered as the sum of FIG. 9(b) and FIG. 9(c), which represent the axial force P and the bending moment M respectively. Then the axial force $$P = bt \frac{\sigma_b + \sigma_t}{2} = btE \frac{\epsilon_b + \epsilon_t}{2} = btE\alpha \frac{T_b + T_t}{2}$$

and the positive moment caused by this axial force P and eccentricity $e_x$ at x is $$M' = Pe_x = btE\alpha \frac{T_b + T_t}{2} e_x$$

which reaches its maximum value of $$btE\alpha \frac{T_b + T_t}{2} e$$

when x=r. And the negative moment caused by the uneven temperature in the plate is $$M = \frac{1}{2} \cdot \frac{t}{2} \cdot b \frac{\sigma_b - \sigma_t}{2} \cdot \frac{2t}{3} = \frac{bt^2}{6} \frac{\sigma_b - \sigma_t}{2} = \frac{bt^2}{6} E\alpha \frac{T_b + T_t}{2}$$

At this point, the fixities of the beam ends ape relaxed. Since it is assumed that the axial force and bending moment will be relaxed by the same proportion, the relaxed force and moments become $$P_1 = kP = kbtE\alpha \frac{T_b + T_t}{2}$$

$$M_1' = kM' = kbtE\alpha \frac{T_b + T_t}{2} e$$

$$M_1 = kM = k \frac{bt^2}{6} E\alpha \frac{T_b - T_t}{2}$$

where k<1. Note that $M_1$ is negative and constant, while $M_1$ is positive and varies from zero at the boundary to its maximum value at center. When combined (see FIG. 10, the combined moment diagram), if $M_1'$ is greater than $M_1$, the central portion of the plate will have net positive moment and hence will bulge downward. But there is always negative moment at the outskirt of the plate, which will cause the plate to bulge upward. In order to make this upward deflecting tendency insignificant, as well as to compensate for the error induced by the assumption of proportional relaxation, $M_1'$ must be made much larger than $M_1$.

Arbitrarily and conservatively let $M_1' = 12 M_1$. Then the negative moment is confined to the r/12 region at the perimeter of the plate (see FIG. 10). Therefore $$kbtE\alpha \frac{T_b + T_t}{2} e = 12k \frac{bt^2}{6} E\alpha \frac{T_b - T_t}{2}$$

$$e = 2 \frac{T_b - T_t}{T_b + T_t} t$$

If $T_b$=800° F. and $T_t$=400° F. above room temperature, then $$e = \frac{2}{3} t$$

If the extraction of best at the top of the plate is so complete (which is not likely in actual life) that it is kept at the stress-free room temperature, i.e., $T_t$=0, then, $$e = 2t$$

Therefore, it can be concluded here that an e of the order of two times the plate thickness is sufficient to avoid the upward bulge of a pot or pan.

DRAWINGS

In the accompanying drawings:

FIG. 5 is an elevation view of the heat shield;

FIG. 6 is a cross section of the pot, corresponding to line 6—6 of FIG. 1.

Figure 9:
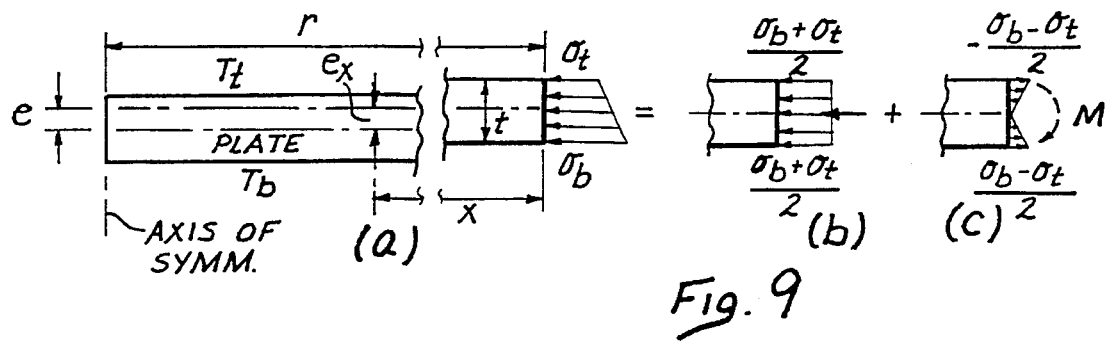
Figure 10:
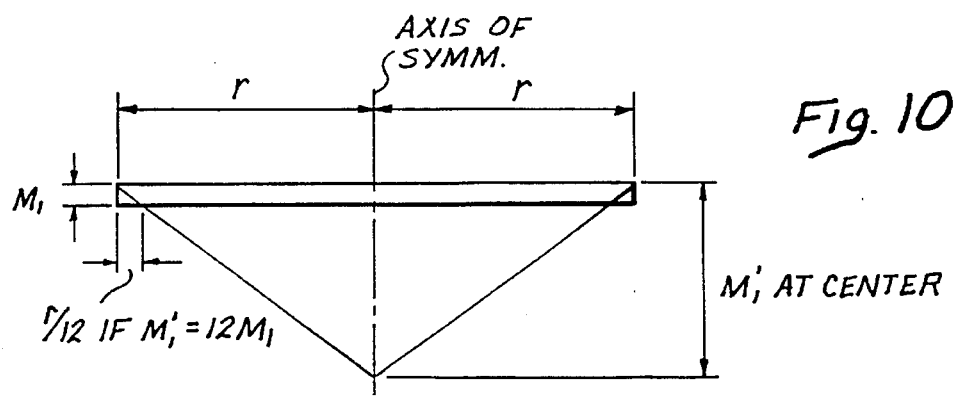

FIG. 8(a) and 8(d) are cross sections of almost flat pot bottoms with exaggerated central depression in the form of a spherical and conical cap respectively;

FIG. 8(b) and 8(e) are the free body diagrams of the pot bottom of FIG. 8(a);

FIG. 8(c) and 8(f) are the free body diagrams of the pot bottom of FIG. 8(d);

FIG. 9(a) is the free body of the right hand side of a diameter strip of the pot bottom with eccentricity e;

FIG. 9(b) and 9(c) are the P and M stress components of the stress at the end of the diameter strip strip of FIG. 9(a);

FIG. 10 is the combined moment diagram of M and M'.

Figure 1:
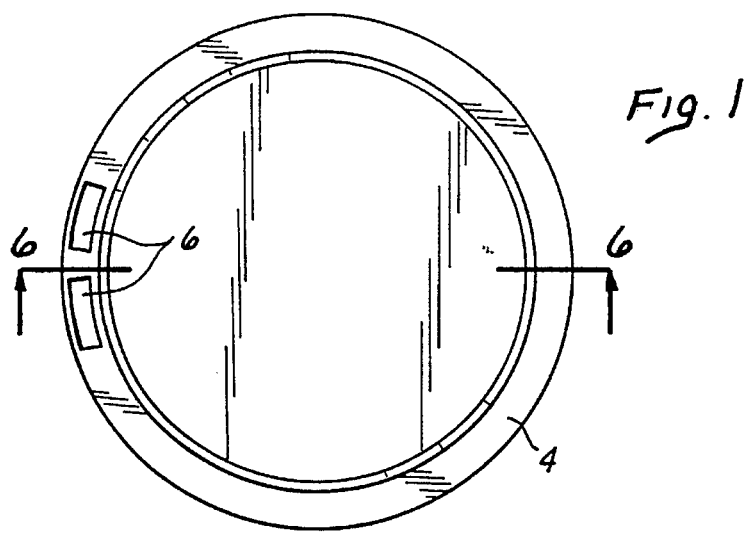
FIG. 1 is a plan view of the pot embodying certain features of the present invention.
Figure 2:
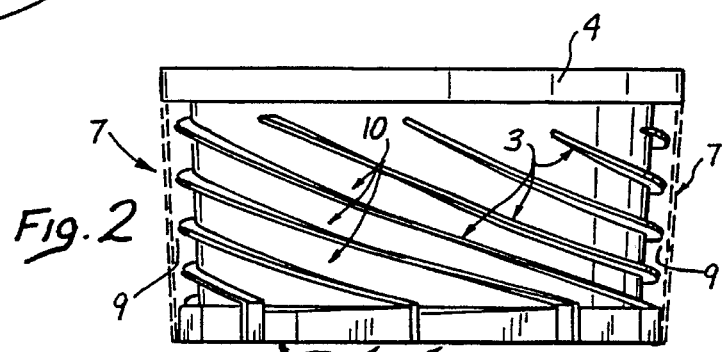
FIG. 2 is an elevation view of the pot with the shield outline shown in dotted lines only.
Figure 3:
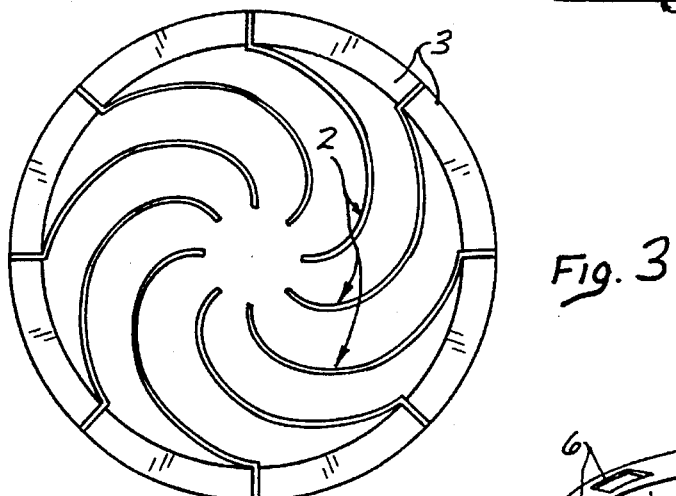
FIG. 3 is a bottom view of the pot.
Figure 4:
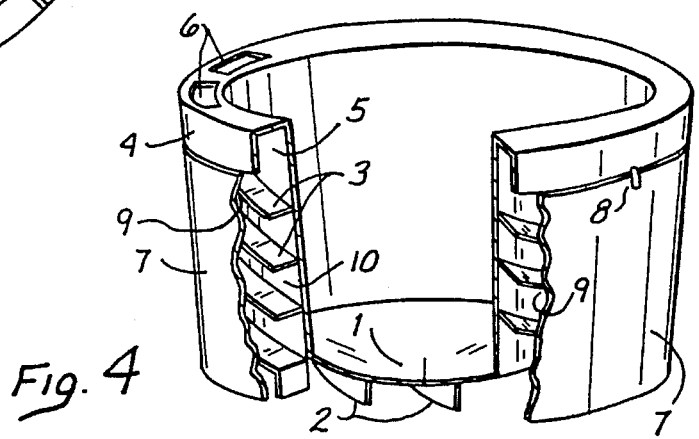
FIG. 4 is a perspective view of the pot with a partial cutaway.
Figure 7:
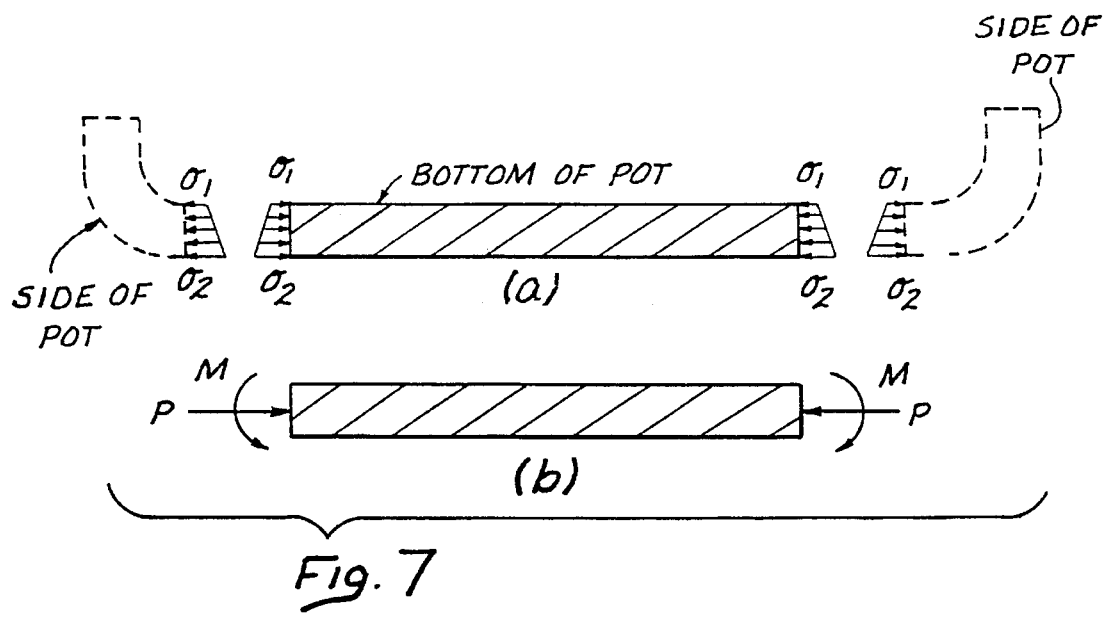
FIG. 7 is the cross section of the free body of the flat bottom of the pot.

It should be noted that (a) Dotted lines for features behind the views are sometimes omitted for clarity. (b) The double inner circle in FIG. 1 is the result of a sloped pot wall. If the pot wall is vertical without sloping, there should be only a single inner circle. (c) The shape of the pot with its bottom depression can vary and be made more artistic. (d) The attaching mechanism of the shield to the pot can be a twist-on one like those used between a pressure cooker and its cover. (e) The shield around the pot is, an independent part of the pot, i.e., the pot can be made without any shield. (f) For shallow pans, the wall fins can be deleted. (g) Pot cover and handle are not shown.

DESCRIPTION OF THE PREFERRED EMBODIMENTS

In these drawings, the pot-bottom depression or eccentricity 1, shown in conical shape here (but can be spherical, parabolic, or any other single curvature surface), has a maximum magnitude at the center of the order of two pot-bottom plate thicknesses. The heat-transferring fins 2 on the pot bottom spiraling outward from the central region hug the pot bottom in such a fashion that the lower edges of the fins 2 fall on a flat plane perpendicular to the axis of symmetry of the pot, After these fins 2 reach the perimeter of the pot bottom, they continue and become the wall fins 3 which bend helically upward on the outside of the pot wall. Both fins 2 and 3 can be of rectangular or trapezoidal (with the base of the trapezoid oil the pot) cross sections. They should be of the same material as or of material with more superior heat transferring quality than, the pot material, and shall be an integral part of or butt welded to the pot. When the fins 3 approach the brim of the pot, they stop short to the pot wall top so that, with the return 4 of the wall top, they form a passageway 5 for the exhaust to reach the single or multiple vent openings 6 on top of the returns. The heat shield or skirt 7 of the heat-insulatiing material, attached to the pot by the three screws or snap-on hooks 8, should have the small gap sufficient for the thermal expansion of the pot, yet small enough such that the shield, the pot wall, and the fins form a series of spiraling ducts 10 acting like exhaust flues.

We claim:

1. A vessel, said vessel comprising a wall encircling a vertical axis, said wall having an upper rim and a lower rim, and said wall being closed at its lower rim by a transverse circular co-axial bottom member, said bottom member being conical and convexed downwardly at a constant angle from the lower rim of the side wall to the vertical axis, and of a predetermined thickness, said convexity having an initial central eccentricity of approximately twice the thickness of the bottom member.

2. A vessel for preparing food and heating liquid, said vessel comprising:

A. A wall encircling a vertical axis, said wall having an upper rim and a lower rim and said wall being closed at its lower rim by a transverse circular co-axial, nearly flat, bottom plate member, said bottom member being at least slightly downwardly convexed;

B. A plurality of fins projecting downwardly from said bottom member in a spiral pattern about said vertical axis, each of said fins having upper edges attached to said bottom member and lower edges extending below said bottom member, all of said lower edges of the fins terminating in a common horizontal plane, and said fins further extending helically up around the lower rim of the wall and about at least a portion of said wall in contact with said wall, whereby said vessel may be placed stably upon a horizontal surface and heat applied centrally below said bottom member will be effectively absorbed by said bottom member and by the vessel walls through the portions of the fins extending therearound.

3. A vessel as described in claim 2 wherein an encircling cover is provided to extend around the encircling wall and in contact with the portions of the fins extending about at least a portion of said wall, said cover having an upper rim portion in contact with the upper rim of the wall.

4. A vessel as described in claim 3 wherein the upper rim of the cover is vented at least one preselected location adjacent the upper rim of the wall.

\* \* \* \* \*

UNITED STATES PATENT AND TRADEMARK OFFICE
CERTIFICATE OF CORRECTION

PATENT NO. : 5,564,589
DATED : October 15, 1996
INVENTOR(S) : Hseuh-Chien Fu, et. al.

It is certified that error appears in the above-indentified patent and that said Letters Patent is hereby corrected as shown below:

Column 2, line 15, the owrd "of" should be inserted after the word "plate".
Column 2, line 25, the word "of" following "spherical" should be replaced by the word "or".
Column 3, line 67, the word "oft" should be replaced by the word "of".
Column 4, line 3, following the word "ratio", the word "l) should be replaced with the Greek letter "$\gamma$".
Column 4, line 4, the word "Tends" should be replaced with the word "ends".
Column 4, line 22, the word "mope" should be replaced with the word "more".
Column 4, lines 36, 37, and 38, the Greek "$\beta$" should be replaced with the Greek symbols "$\epsilon$".
Column 5, line 14, the word "ape" should be replaced with the word "are".
Column 6, line 32, after "is" --, should be deleted.
    line 47, after "pot" insert--.
    line 51, "oil" should be repaced with the word "on".
    line 61, after "gap" insert--9--.

Signed and Sealed this

Fourteenth Day of January, 1997

Attest:

BRUCE LEHMAN

*Attesting Officer*  *Commissioner of Patents and Trademarks*